(12) United States Patent
Lintunen (10) Patent No.: US 10,247,293 B2
(45) Date of Patent: Apr. 2, 2019

(54) METHOD AND SYSTEM FOR EVALUATING AND PREDICTING SPROCKET TOOTH WEAR

(71) Applicant: Andritz Inc., Glen Falls, NY (US)

(72) Inventor: Timo Lintunen, Alpharetta, GA (US)

(73) Assignee: Andritz Inc., Glens Falls, NY (US)

( * ) Notice: Subject to any disclaimer, the term of this patent is extended or adjusted under 35 U.S.C. 154(b) by 252 days.

(21) Appl. No.: 15/440,124

(22) Filed: Feb. 23, 2017

(65) Prior Publication Data

US 2017/0241536 A1 Aug. 24, 2017

Related U.S. Application Data

(60) Provisional application No. 62/298,616, filed on Feb. 23, 2016.

(51) Int. Cl.
| | | |
|---|---|---|
| *G01B 3/38* | (2006.01) | |
| *F16H 57/01* | (2012.01) | |
| *B65G 23/06* | (2006.01) | |

(52) U.S. Cl.
CPC .............. *F16H 57/01* (2013.01); *G01B 3/38* (2013.01); *B65G 23/06* (2013.01); *B65G 2207/48* (2013.01); *F16H 2057/012* (2013.01)

(58) Field of Classification Search
CPC ..... B65G 23/06; B65G 2207/48; F16H 57/01; F16H 57/012; G01B 3/38; G01B 5/20; G01B 5/202; G01M 13/021
USPC .................................... 33/545, 546, DIG. 14
See application file for complete search history.

(56) References Cited

U.S. PATENT DOCUMENTS

| | | | | |
|---|---|---|---|---|
| 1,027,418 A | * | 5/1912 | Heide ...................... | G01B 3/18 33/501.11 |
| 1,346,224 A | * | 7/1920 | McCormick ............. | G01B 5/20 33/193 |
| 2,657,469 A | | 11/1953 | Brown | |
| 3,100,940 A | | 8/1963 | Vynes | |
| 3,193,936 A | | 7/1965 | Schnitzer | |

(Continued)

FOREIGN PATENT DOCUMENTS

| | | | | |
|---|---|---|---|---|
| EP | 0801730 | | 7/2001 | |
| GB | 510443 A | * | 8/1939 | ............... G01B 5/20 |

(Continued)

OTHER PUBLICATIONS

"AGMA and ISO Accuracy Standards" Smith, Robert E., "Gear Technology" May/Jun. 1998 issue, pp. 21-24.

*Primary Examiner* — Yaritza Guadalupe
(74) *Attorney, Agent, or Firm* — Robert Joseph Hornung (57) ABSTRACT

An exemplary method may comprise: ascertaining an original distance between a first tooth face and a second tooth face of a sprocket tooth, wherein the sprocket tooth comprises two tooth faces extending from a sprocket core and terminating in a top of the sprocket tooth, wherein an original distance separates the two tooth faces, placing a sprocket gauge on the sprocket tooth, wherein the sprocket gauge comprises: a bottom, and two gauge faces extending from the bottom of the sprocket gauge, wherein the bottom of the sprocket gauge is disposed upon the top of the sprocket tooth and the first gauge face is disposed adjacently on the first tooth; and comparing the original distance defined by the sprocket gauge with an actual distance between the first tooth face and the second tooth face.

20 Claims, 5 Drawing Sheets

(56) References Cited

U.S. PATENT DOCUMENTS

| | | | |
|---|---|---|---|
| 3,548,481 A | | 12/1970 | Bohn et al. |
| 3,732,626 A | * | 5/1973 | Miller, Jr. ................ G01B 5/20 33/501.08 |
| 4,137,642 A | | 2/1979 | Halvarsson |
| 4,185,391 A | | 1/1980 | Roley |
| 4,811,490 A | | 3/1989 | Ueda et al. |
| 5,083,458 A | | 1/1992 | Degeorge et al. |
| 5,203,861 A | * | 4/1993 | Irwin ..................... B65G 23/06 474/161 |
| 5,348,515 A | | 9/1994 | Miller |
| 5,392,644 A | | 2/1995 | Frazier |
| 5,461,797 A | | 10/1995 | Royer et al. |
| 5,513,442 A | * | 5/1996 | Flair ................... G01M 13/021 33/501.13 |
| 5,624,301 A | | 4/1997 | Lenz et al. |
| 5,978,500 A | | 11/1999 | Broughton |
| 7,730,627 B2 | | 6/2010 | Mashue et al. |
| 2004/0002402 A1 | * | 1/2004 | Nakamura ............. F16H 55/30 474/156 |
| 2017/0146109 A1 | * | 5/2017 | Reiter ................... B62M 9/105 |
| 2017/0241536 A1 | * | 8/2017 | Lintunen ................ G01B 3/38 |

FOREIGN PATENT DOCUMENTS

| | | | | |
|---|---|---|---|---|
| GB | 1591228 A | * | 6/1981 | ............ G01B 5/202 |
| SU | 653503 A1 | * | 3/1979 | ............... G01B 5/20 |
| SU | 1686301 A1 | * | 10/1991 | ............... G01B 5/20 |
| WO | 03/093783 | | 11/2003 | |

* cited by examiner

FIG. 1

(Prior Art)

FIG. 2

(Prior Art)

METHOD AND SYSTEM FOR EVALUATING AND PREDICTING SPROCKET TOOTH WEAR

CROSS-RELATED APPLICATION

This application is a Non-Provisional Application claiming the benefits of U.S. Provisional Application Ser. No. 62/298,616 filed on Feb. 23, 2016, the entirety of which is incorporated herein by reference.

BACKGROUND OF THE INVENTION

1. Technical Field

The present disclosure relates generally to a method for evaluating gear wear on chain conveyors and particularly to evaluating gear wear on chain conveyors in the pulp and paper industry and the recycling industry.

2. Related Art

In the pulp and paper industry and the recycling industry, equipment manufacturers periodically evaluate the condition and performance of the equipment sold to customers. In pulp and paper wood yards, for example, manufacturers preliminary inspect a wood yard several months before an annually scheduled maintenance shutdown. These intermediate, preliminary inspections allow the equipment manufactures to provide the wood yard operators with data and allow the mill yard operators to plan for equipment repair, replacement, or refurbishment during a later scheduled maintenance shutdown.

Wood yards generally have different types of chain conveyors, which may be used to transfer logs, wood chips, or other products throughout the wood yard. These may include for example, wide wood chain conveyors, incline chain conveyors, chip infeed chain conveyors, drain discharge chain conveyors, and power feed chain conveyors. Each chain conveyor may have at least two distally disposed shafts and a sprocket on each of the shaft engaging links in a chain. Sprocket teeth primarily wear on the tooth face that pulls against the chain link; however, all tooth faces that pull against the chain link tend to wear evenly on a given sprocket, thereby rendering visual inspection unreliable. The sprocket is also set into the chain conveyor equipment, and the exposed sprocket teeth are usually obstructed by chain links engaging the sprocket tooth. For at least these reasons, operators have difficulty accessing a sprocket tooth to evaluate sprocket tooth wear without first deactivating and partially dismantling the chain conveyor. However, removing a sprocket from a chain conveyor requires an extended shutdown, which contributes to loss of production.

By way of example, an inspecting equipment manufacturer may recommend that the extracted sprocket be sent to an offsite facility for precision measurement of tooth wear. Precision measuring equipment, such as the devices disclosed in U.S. Pat. Nos. 3,100,940; 3,193,936; 4,137,642; 5,392,644; and 5,461,797 tends to be bulky, requires precise calibration before use, and necessitates having the entire sprocket at the same location as the precision measuring equipment. The precision measuring equipment's size and sensitivity generally preclude the prevision measuring equipment's portability. However, shipping worn sprockets back to the manufacturer for detailed wear analysis can delay production significantly. Furthermore, the sprockets themselves can be quite heavy and removing and shipping the sprockets poses safety risks to handling personnel.

Moreover, wood yard operators generally do not a have clear understanding of the condition of their sprockets. Therefore, maintenance tends not to be done at time of convenience, but rather at the time of emergency.

When a sprocket fails, the broken sprocket tooth renders the chain conveyor non-functional, which can pose an immediate safety risk to operating personnel and disrupt production for weeks. Accordingly, there is a long felt need for a device and method that overcomes the limitations of the prior art.

SUMMARY OF THE INVENTION

Applicant has discovered that wood yards shafts and sprockets in chain conveyors generally benefit from maintenance between three to five year intervals, but has experienced difficulty convincing customers to repair or replace shafts and sockets. Without being bounded by theory, Applicant believes that this problem is due in part to a lack of a method and system that minimally disrupts production.

In response to discovering a source of the problem of lost production attributable to sprocket failure, Applicant has conceived a method and system for replacing worn sprockets with new sprockets before sprocket failure. Such method and system includes the use of a sprocket gauge configured to define a concave area, the concave area being an inverse of a theoretical profile of the sprocket tooth being evaluated. The concave area preferably encompasses the original dimensions, including the original width and original length; the original width and the original height comprising the theoretical profile of the sprocket tooth being measured. The theoretical profile for a given sprocket tooth to be evaluated may be based on the "K" charts previously released by the American Gear Manufacturers Association ("AMGA"), by accuracy standards released by the International Organization for Standardization ("ISO"), or by other accuracy standards of measurement that be used to describe sprocket teeth profiles.

An exemplary system and method may comprise placing a sprocket gauge on the sprocket tooth. The sprocket gauge may comprise a bottom and a first gauge face side extending from the bottom, the bottom may be disposed upon the top of the sprocket tooth and the first gauge face side of the sprocket gauge may be disposed adjacently on the first tooth face such that the bottom of the sprocket gauge and the first gauge face side of the sprocket gauge form a reflex angle and the top of the sprocket tooth and first tooth face of the sprocket tooth form a central angle, and wherein a central point created by the reflex angle and the center angle defines a first reference point.

An exemplary system and method further comprises comparing a length of the top of the sprocket tooth, with a length of the bottom of the sprocket gauge, the length of the bottom of the sprocket gauge defined by a distance between the first reference point and an second reference point disposed on the bottom of the sprocket gauge distally from the first reference point at a location corresponding to the original length of the top of the sprocket tooth.

Exemplary embodiments of the present disclosure may allow persons to visualize the extent of sprocket tooth wear while the sprocket is still at a production facility (e.g. a wood yard, a recycling plant, or other facilities having equipment that can be temporarily deactivated and wherein sprocket teeth may become exposed). Preferably, the exemplary embodiment described herein may allow persons to visualize sprocket tooth wear, while the sprocket is disposed within the equipment. Exemplary embodiments may further permit visualization of sprocket tooth wear along a length or a width of a sprocket tooth, or both a width and a length of a sprocket tooth simultaneously.

Exemplary embodiments of the present disclosure may allow persons to quantify wear in numerical values and thereby prescribe sprocket replacement when sprocket tooth wear approaches a critical point. In other exemplary embodiments, assigning numerical values to wear may allow persons to prescribe sprocket replacement when sprocket tooth wear exceeds the critical point. The sprocket gauge may be made from aluminum, steel, stainless steel, or other material configured to preserve the shape of the gauge.

BRIEF DESCRIPTION OF THE DRAWINGS

The foregoing will be apparent from the following more particular description of exemplary embodiments of the disclosure, as illustrated in the accompanying drawings in which like reference characters refer to the same parts throughout the different views. The drawings are not necessarily to scale, with emphasis instead being placed upon illustrating embodiments of the disclosed device.

DETAILED DESCRIPTION OF THE INVENTION

The following detailed description of the preferred embodiments is presented only for illustrative and descriptive purposes and is not intended to be exhaustive or to limit the scope and spirit of the invention. The embodiments were selected and described to best explain the principles of the invention and its practical application. A person of ordinary skill in the art will recognize that many variations can be made to the invention disclosed in this specification without departing from the scope and spirit of the invention. Except as otherwise stated, corresponding reference characters indicate corresponding parts throughout the several views. Although the drawings represent embodiments of various features and components according to the present disclosure, the drawings are not necessarily to scale and certain features may be exaggerated in order to better illustrate embodiments of the present disclosure, and such exemplifications are not to be construed as limiting the scope of the present disclosure in any manner.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Although specific terms are used in the following description for the sake of clarity, these terms are intended to refer only to the particular structure of the embodiment selected for illustration in the drawings, and are not intended to define or limit the scope of the disclosure.

The singular forms "a," "an," and "the" include plural referents unless the context clearly dictates otherwise. Numerical values should be understood to include numerical values which are the same when reduced to the same number of significant figures and numerical values which differ from the states value by less than the experimental error of conventional measurement technique of the type described in the present application to determine the value.

All ranges disclosed herein are inclusive of the recited endpoint and are independently combinable (for example, the range "40 degrees to 60 degrees" is inclusive of the endpoints, 40 degrees and 60 degrees, and all intermediate values.

As used herein, approximating language may be applied to modify any quantitative representation that may vary without resulting in a change in the basic function to which it is related. Accordingly, a value modified by a term or terms, such as "about" and "substantially," may not be limited to the precise values specified. The modifier "about" should also be considered as disclosing the range defined by the absolute values of the two endpoints. For example the expression "from about 2 to about 4" also discloses the range "from 2 to 4."

It should be noted that many of the terms used herein are relative terms. For example, the terms "upper" and "lower" are relative to each other in location, i.e. an upper component is located at a higher elevation than a lower component in a given orientation, but these terms can change if the device is flipped. The terms "inlet' and "outlet" are relative to a fluid flowing through them with respect to a given structure, e.g. a fluid flows through the inlet into the structure and flows through the outlet out of the structure. The terms "upstream" and "downstream" are relative to the direction in which a chips or water flow or a signal moves through various components, i.e. the signal encounters an upstream component prior to encountering the downstream component.

The terms "top" and "bottom" or "base" are used to refer to locations/surfaces in the orientation depicted in the figures. The terms "upwards" and "downwards" are also relative to an absolute reference; an upwards flow is always against the gravity of the Earth.

The figures depict the sprocket tooth as a trapezoidal prism, but it will be understood that sprocket teeth having other three dimensional geometric shapes, including prisms, spheroids, conoids, other three dimensional geometric shapes having a curved surface exposed to a chain link, and combinations thereof are within the scope of this disclosure. It will be further understood that in exemplary embodiments where one or more sprocket teeth have a three dimensional shape of a spheroid, conoid, or other curved surface exposed to a chain link, that the surface against which the chain link drags is the second tooth face for purposes of this disclosure.

Figure 1:
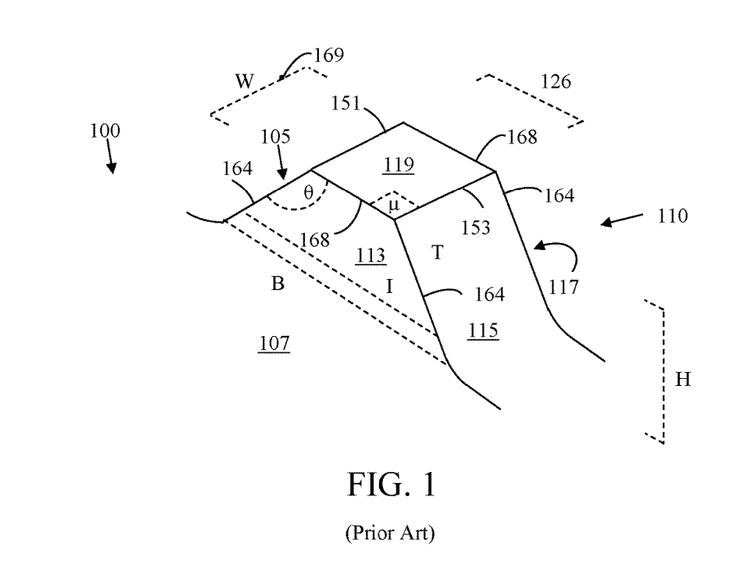
FIG. 1 is an isometric view of a sprocket tooth depicting a selection of the sprocket tooth's original dimensions.

FIG. 1 is a top-down perspective view of a sprocket tooth 110 disposed on a sprocket 100. The depicted sprocket tooth 110 extends from a sprocket core 107. The depicted sprocket tooth 110 comprises areas defining a first base side 113 distally disposed from a second base side 117 and a first tooth face 105 oppositely or distally disposed from a second tooth face 115. The second tooth face 115 engages the first base side 113 and second base side 117 at original side edges 164. Likewise, the first tooth face 105 engages the first base side 113 and second base side 117 at original side edges 164. Top-base side edges 168 define the boundaries of the top 119 of the sprocket tooth 110 where the first base side 113 and the second base side 117 engage the top 119 of the sprocket tooth 110. Similarly, the top 119 of the sprocket tooth 110 engages the first tooth face 105 at the original first top edge 151 and the top 119 engages the second tooth face 115 at the original second top edge 153. An original width W is the width of the second tooth face 115. In other exemplary embodiments, the original width W may be the width of the first tooth face 105.

The sprocket tooth 110 has original dimensions comprising an original height H and an original top length 126. The original first top edge 151 of the sprocket tooth 110 and the original second top edge 153 of the sprocket tooth 110 define the original top length 126. Other original sprocket tooth dimensions may include an original width W, original intermediate lengths I measured from a first tooth face 105 to a second tooth face 115, original base length B, original central angles θ, original side-edge angles μ, an original thickness T (FIG. 6), and other original dimensions common to sprocket teeth 110. It will be understood that the term "original" when used in "original dimension" refers to a reference measurement against which a later-taken reference measurement may be compared. As such, an "original dimension" may be determined based on a theoretical profile derived from accuracy standards (e.g. from "K" charts, ISO accuracy standards) for the sprocket tooth 110 to be measured. Such theoretical profiles may be determined from ISO, AGMA, or other industry accuracy standards. In other exemplary embodiments, an original distance between the first tooth face 105 and the second tooth face 115 may comprise the original top length 126, an original intermediate length l measured from a first tooth face 105 to a second tooth face 115, or the original base length B. The thickness T comprises the volume of the sprocket tooth 110. When the sprocket tooth 110 is a trapezoidal prism, the thickness T may be calculated with the following formula:

$$\tfrac{1}{2}h(a+b)w$$

Where "h" is the value of the original height H, "a" is the value of the original top length 126, "b" is the value of the original base length B, and "w" is the value of the original width W of a sprocket tooth 110.

On a new or minimally worn sprocket tooth 110, the side-edge angle μ is typically 90 degrees (°). By way of example, the second tooth face 115 and a first base side 113 can define an original side-edge angle μ at an original side-edge 164 of the sprocket tooth 110. Likewise, a first base side 113 and the first tooth face 105 of the sprocket tooth can define an original side-edge angle μ at an original side-edge 164 of the sprocket tooth 110.

Figure 2:
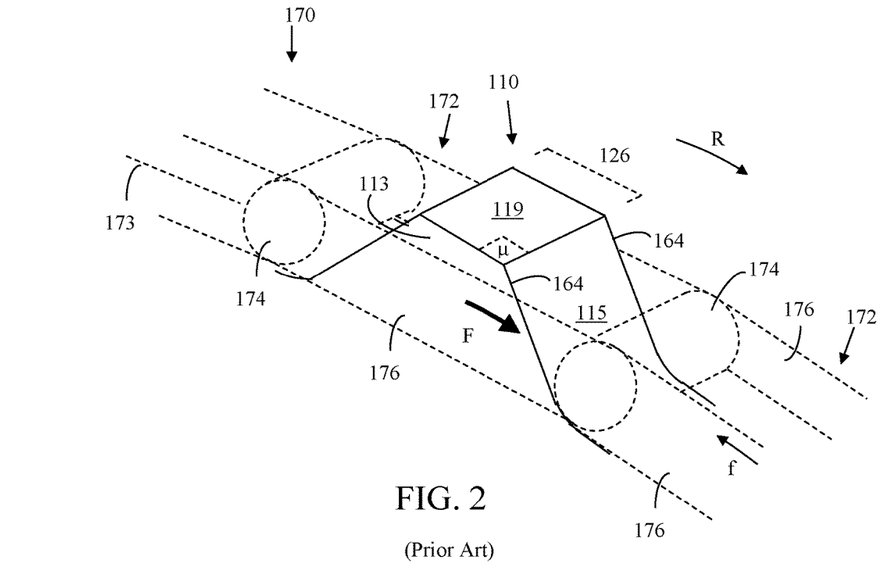
FIG. 2 is an isometric view of a sprocket tooth depicting and a chain link disposed around the sprocket tooth.

FIG. 2 depicts a section of a chain 170 disposed around a sprocket tooth 110. Successive sprocket teeth 110 engage successive chain links 172 at set intervals. Each chain link 172 may comprise a series of journal bearings 174 and link plates 176. As the sprocket 100 rotates (see rotational direction R), the sprocket teeth 110 move successive chain links 172 around the sprocket core 107 and thereby pull subsequent chain links 172 toward available sprocket teeth 110.

Gears wear over time. For example, in log chain conveyors, manufactures may affix hooks to chain links 172. These hooks drag logs across a distance as the chain moves. Generally, a journal bearing 174 in each chain link 172 pulls against the second tooth face 115 of each sprocket tooth 110. Over time, the journal bearings 174 grind away the second tooth face 115 of each sprocket tooth 110. (See FIG. 5). Because successive chain links 172 are substantially identical, and because the chain links 172 pull against substantially identical sprocket teeth 110 at fixed internals, the chain links 172 tend to wear sprocket teeth 110 substantially evenly. Because the sprocket teeth 110 tend to wear evenly, it can be difficult for persons to evaluate the amount of sprocket tooth wear visually.

Figure 6:
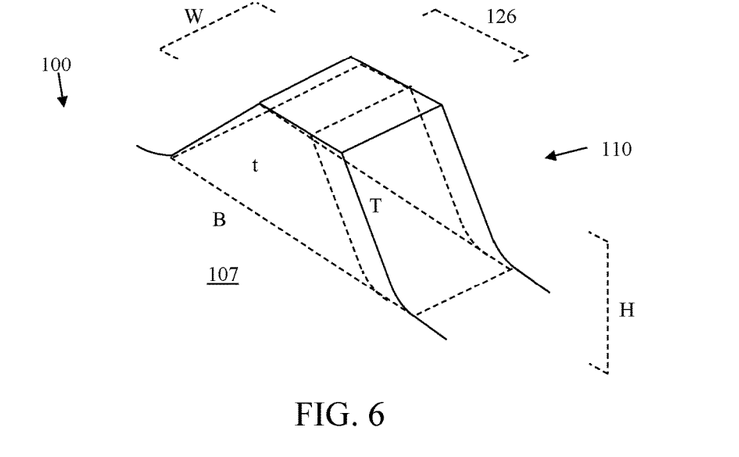
FIG. 6 is an isometric view of a sprocket tooth showing the original thickness and minimum thickness of the sprocket tooth.

To move a chain link 172, sprocket teeth 110 generally require a minimum thickness t (FIG. 6). The thickness T of a sprocket tooth corresponds to the mass of the sprocket tooth 110. Without being bounded by theory, the chain link 172 exerts a force f on the sprocket tooth 110 as the chain link 172 drags the mass of the chain 170 and any object the chain 170 carries along the length of the conveyor (e.g. logs, wood chips, etc.). The mass of the sprocket tooth 110 exerts an opposite force to prevent the chain link 172 from slipping on the sprocket 100. The mass of the sprocket 100, torsional force supplied by an active motor (not depicted) together with the mass of the sprocket tooth 110 create a sprocket force F that generally exceeds the force f of the chain link 172 pulling against a sprocket tooth 110, and thereby permits the sprocket tooth 110 and sprocket 100 to move the chain link 172 in the sprocket rotational direction R.

If a sprocket tooth's thickness T falls below the minimum thickness t, the force f the chain 170 exerts can exceed the sprocket force F the sprocket tooth 110 exerts, thereby allowing the chain 170 slip off the sprocket tooth. If a sprocket tooth's thickness T is below the minimum thickness t, the chain 170 may further shear off one or more sprocket teeth 110 and thus render the conveyor inoperable.

Applicant has recognized that sprocket wear can vary depending upon the sprocket alloy, the angle at which the chain links 172 engage the second tooth face 115 of the sprocket tooth 110, the velocity at which the sprocket 100 rotates, the amount of force f the chain 170 applies to the sprocket 100, and other design and operation factors. For these reasons, the value of the minimum thickness t depends on a number of design criteria and operating conditions.

Applicant has further discovered that mill operators are generally not aware of the minimum thickness t for the sprocket teeth 110 in the mill operator's mills. As a result, the mill operators do not account for the sprocket teeth's minimum thickness t during maintenance periods. This practice permits chains 170 to grind away the tooth faces 115, 105 of sprocket teeth 110 and thereby reduce the original thickness T of the sprocket teeth 110 beyond the minimum thickness t. This practice risks the safety of operating personnel and risks production loss when one or more sprocket teeth 110 fail. Applicant has further discovered that sprocket teeth's substantially uniform wear coupled with a general human inability to discern small changes in measurement, creates a situation in which mill operators cannot accurately estimate when to replace sprockets 100.

To address safety risks and production loss attributable to the thickness T of a sprocket tooth 110 falling behind the sprocket tooth's minimum thickness t, Applicant has devised an exemplary tool, and exemplary method, and an exemplary system comprising an exemplary sprocket gauge 120.

Figure 3:
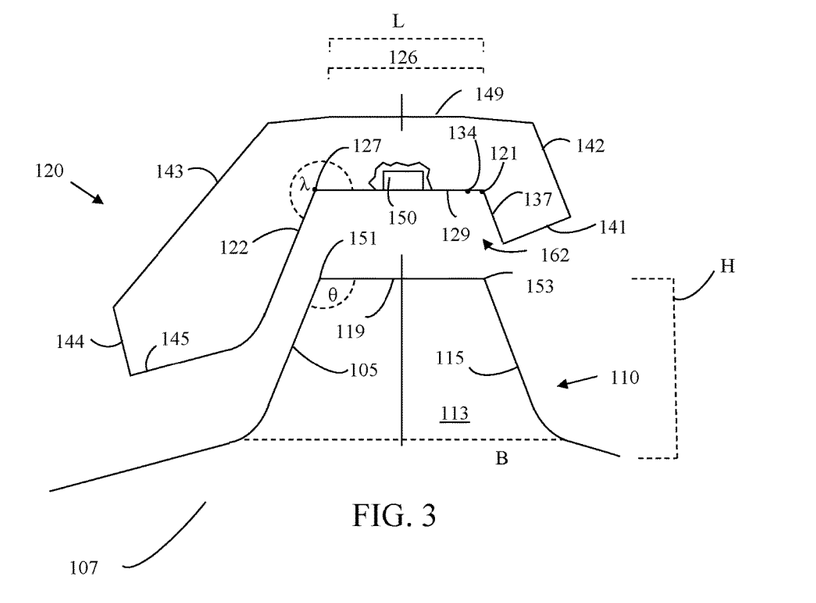
FIG. 3 is a side view of an exemplary system depicting the exemplary sprocket gauge positioned over a sprocket tooth.

FIG. 3 is a side view of an exemplary system comprising a sprocket tooth 110 and sprocket gauge 120. In this exemplary embodiment, the sprocket gauge 120 has a bottom 129, a first gauge face 122 extending from the bottom 129 of the sprocket gauge 120, and a second gauge face 137 extending from the bottom 129 of the sprocket gauge 120. The bottom 129, first gauge face 122, and second gauge face 137 define a concave area 162. The concave area 162 may be manufactured to reflect a theoretical profile of the sprocket tooth 110 being measured. The theoretical profile for a given sprocket tooth to be evaluated may be based on the "K" charts or other accuracy standards previously released by the American Gear Manufacturers Association ("AGMA"), by accuracy standards released by the International Organization for Standardization ("ISO"), or by other accuracy standards of measurement that be used to describe sprocket teeth profiles. Accordingly, the concave area 162 may comprise original dimensions of the sprocket tooth 110 to be measured.

For example, the concave area 162 preferably encompasses the original width W and the original length L of the sprocket tooth 110 being measured. The sides of a sprocket tooth 110 may wear unevenly (see FIGS. 7-8) if the sprocket 100 is not aligned with the rotational axis. By encompassing the original width W and the original length L, the sprocket gauge 120 permits persons to detect sprocket tooth 110 wear along both the length and width of the sprocket tooth simultaneously.

In the depicted embodiment, the second gauge face 137 is located opposite the first gauge face 122 such that the second gauge face 137 faces the first gauge face 122. The original distance between the first tooth face 105 and the second tooth face 115 separates the first gauge face 122 from the second gauge face 137. In other exemplary embodiments, the distance between the first tooth face 105 and the second tooth face 115 may be determined based on a theoretical tooth profile derived from accuracy standards for the sprocket tooth 110 to be measured. Such standards may be taken from, for example, publications released by the ISO, AGMA, or other industry organization that releases accuracy standards. In FIG. 3, the original top length 126 represents the original distance. The original top length 126, intermediate lengths I (FIG. 2), the original base length B, the length l' (FIG. 4) of the first tooth face 105, and the length l' (FIG. 4) of the second tooth face 115 define a two-dimensional shape along a common width W reference point 169 (FIG. 1). This two-dimensional shape is a cross section of the sprocket tooth 110 at a given width W reference point 169. In FIG. 3, the two-dimensional shape is substantially a trapezoid. It will be understood that the "original distance" may further comprise the original top length 126, intermediate lengths I, and base length B, comprising the two-dimensional, cross section shape of the sprocket tooth 110.

The sprocket gauge 120 may be made from aluminum, steel, stainless steel, or other material configured to preserve the shape of the sprocket gauge 120. The sprocket gauge 120 is preferably made from a rigid, durable material, configured to be precision manufactured to define a theoretical profile of the sprocket tooth 110 to be measured. The sprocket gauge 120 further comprises a top 149 and outer sides 141, 142, 143, 144 and 145. In certain exemplary embodiments, the sprocket gauge 120 further comprises a magnet 150. The magnet 150 can magnetically fix the sprocket gauge 120 to the sprocket tooth 110. Although the depicted magnet 150 extends into the bottom 129 of the sprocket gauge 120, it will be understood that a magnet 150 may be disposed in or on the sprocket gauge 120 without restriction to location provided that the magnet magnetically affixes the sprocket gauge 120 to the sprocket tooth 110 when the sprocket gauge 120 is disposed on a sprocket tooth 110. In other exemplary embodiments, the sprocket gauge 120 may comprise more than one magnet 150.

Figure 4:
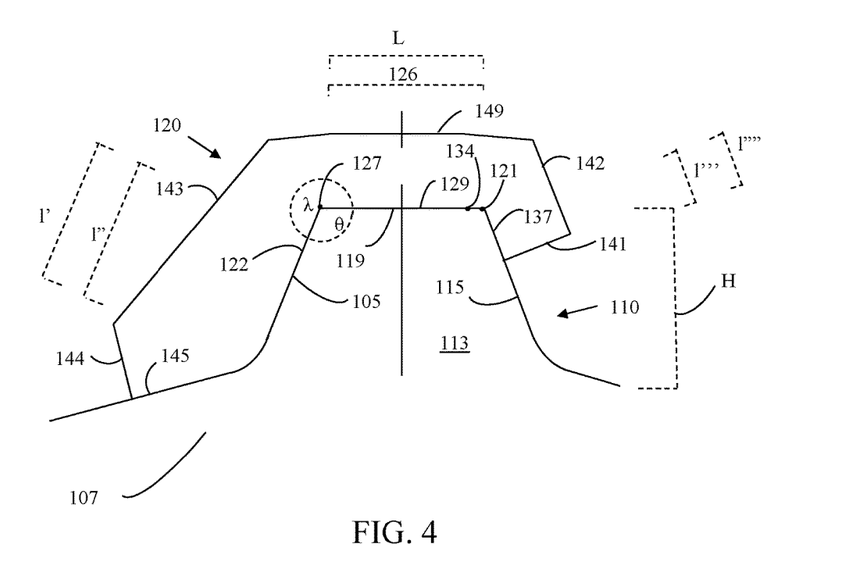
FIG. 4 is a side view of an exemplary system depicting the exemplary sprocket gauge disposed on a sprocket tooth.

The top 119 of the sprocket tooth 110 and first tooth face 105 of the sprocket tooth 110 form a central angle θ. The center of reflex angle defines a first reference point 127. The first reference point 127 may rest upon the original first top edge 151 in certain exemplary embodiments. The first tooth face 105 and the original first top edge 151 generally wear at a lesser rate than the second tooth face 115 and the original second top edge 153. FIG. 3 and FIG. 4 illustrate how the bottom 129 of the sprocket gauge 120 and the second gauge face 137 define a second reference point 121 at the point where the bottom 129 of the sprocket gauge 120 and the second gauge face 137 intersect. The sprocket gauge may further comprise a third reference point 134 indicating the minimum thickness t of the sprocket tooth 110. The third reference point 134 may be engraved, stamped, or otherwise deposited on the sprocket gauge 120. In other exemplary embodiments, the third reference point 134 may not be physically marked on the sprocket gauge 120.

FIG. 4 depicts a sprocket gauge 120 placed on a sprocket tooth 110. The bottom 129 of the sprocket gauge 120 is disposed upon the top 119 of the sprocket tooth 110 and the first gauge face 122 of the sprocket gauge 120 is disposed adjacently on the first tooth face 105 of the sprocket tooth 110. The bottom 129 of the sprocket gauge 120 and the first gauge face 122 of the sprocket gauge 120 form a reflex angle λ. In certain exemplary embodiments, the length l" of the first gauge face 122 may be substantially equal to the length l' of the first tooth face 105. In other exemplary embodiments, the length l" of the first gauge face 122 may exceed the length l' of the first tooth face 105. In still other exemplary embodiments, the length l" of the first gauge face 122 may be less than the length l' of the first tooth face 105 provided that the length l" and width of the first gauge face 122 are sufficient to allow the first gauge face 122 and bottom 129 of the sprocket gauge 120 to be parallel to the top length 126, 124 of the sprocket tooth 110.

Similarly, in certain exemplary embodiments, the length l'" of the second gauge face 137 may be substantially equal to the length l'" of the second tooth face 115. In further exemplary embodiments, the length l"" of the second gauge face 137 may exceed the length l'" of the second tooth face 115. In still further exemplary embodiments, the length l"" of the second gauge face 137 may be less than the length l'" of the second tooth face 115 provided that the length l"" of the second gauge face 137 is sufficient to define a gap 180 (FIG. 5) between the second gauge face 137 and the second tooth face 115 if the sprocket tooth is worn. The gap 180 allows a person to visualize the extent of sprocket tooth wear to better estimate a time to replace sufficiently worn sprocket teeth 110.

Figure 5:
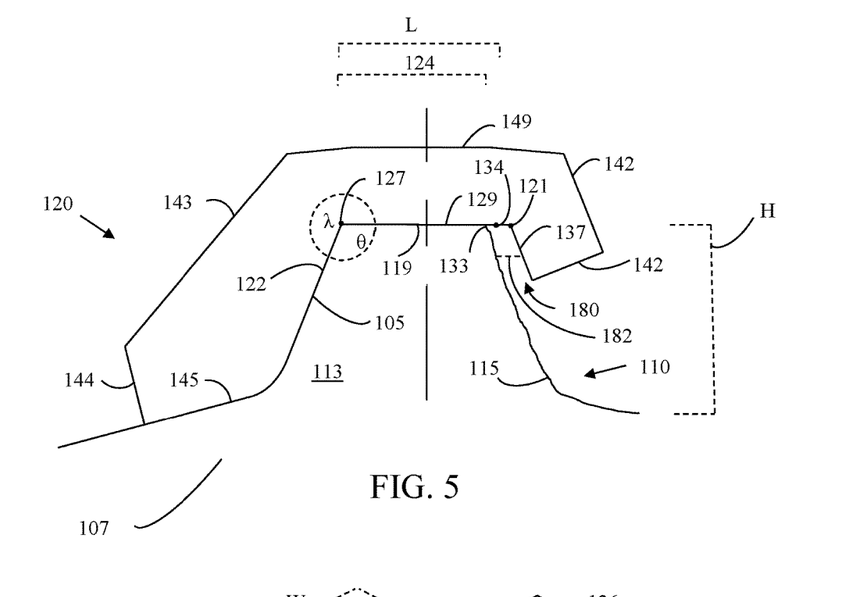
FIG. 5 is a side view of the exemplary system illustrating a worn second tooth face of the sprocket tooth and the exemplary sprocket gauge.

FIG. 5 depicts a sprocket gauge 120 disposed upon a worn sprocket tooth 110. The second gauge face 137 creates a gap 180 between the second gauge face 137 and the second tooth face 115 if the sprocket tooth 110 is worn. The second gauge face 137 allows a person to visualize sprocket tooth wear. A person may measure the gap length 182 between the second gauge face 137 and the second tooth face 115 to ascertain the degree of wear. The gap length 182 may vary along the width W of the sprocket tooth 110. The person may use calipers, a ruler, a bar of known size, or other measurement instrument to measure the length of the gap 180. In embodiments wherein the sprocket gauge 120 lacks a third reference point 134 that is physically marked on the sprocket gauge 120, a person may compare the measurement of the gap 180 with a reference guide that lists the minimum thickness t for the measured sprocket 100.

Figure 7:
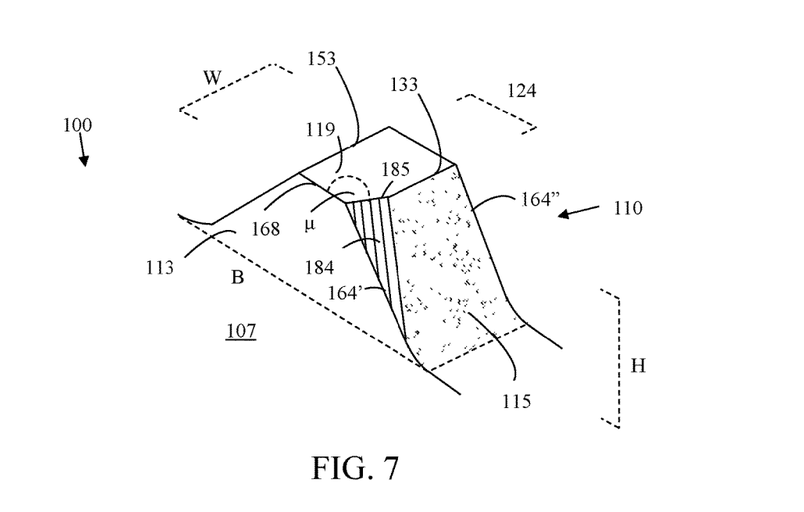
FIG. 7 is an isometric view of a sprocket tooth illustrating uneven wear on the second tooth face.
Figure 8:
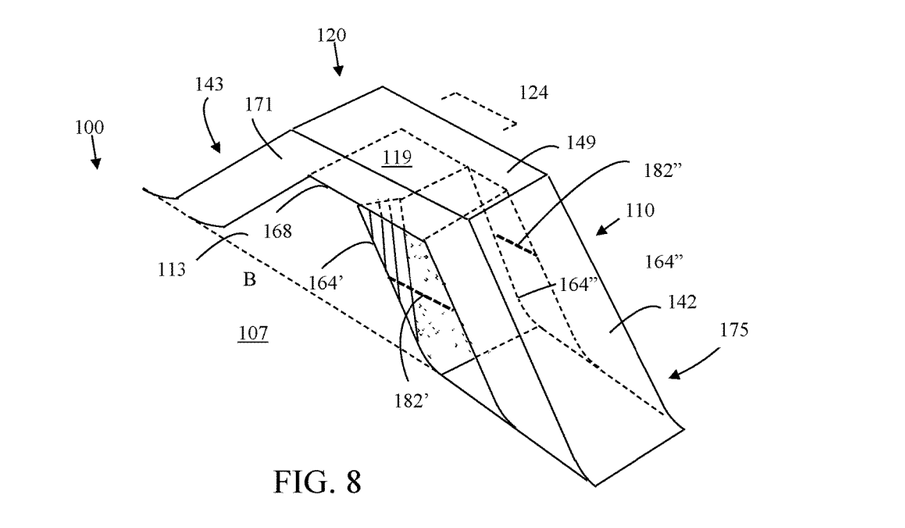
FIG. 8 is an isometric view of a sprocket tooth illustrating uneven wear on the second tooth face and further depicting an exemplary sprocket gauge depicting differences in second tooth face wear.

Exemplary systems and methods involving the sprocket gauge allow a person to visualize and evaluate wear patterns to identify suboptimal sprocket performance. FIG. 7 illustrates a worn sprocket tooth 110 with uneven wear on the second tooth face 115. The shorn corner 184 has a shorn top edge 185. The shorn top edge 185 together with the top-base side edge 168 defines a side-edge angle µ that is less than 90°. FIG. 7 exaggerates the shorn corner 184 for illustrative purposes. In practice, it is difficult for a person to ascertain small differences in gap length 182 between a tooth first original side edge 164' and a second original side edge 164". FIG. 8 illustrates how the first gap length 182' measured from a gauge's first side edge 188' to the tooth's first original side edge 164' is greater than a second gap length 182". In FIG. 8, the second gap length 182" depicted as the distance between a gauge's second side edge 188' and the tooth's second original side edge 164" although it will be understood that the second gap length 182" may be any gap length 182 along the width W of height H of the sprocket tooth 110 provided that the second length 182" is measured from a different location than the first gap length 182'.

In FIGS. 7 and 8, the shorn corner 184 on the tooth's first original side edge 164' indicates that the chain 170 is not perpendicularly disposed around the sprocket tooth 110 during operation. That is, the width W of the sprocket tooth 110 is not pulling the chain links 172 at a 90° angle to the center line 173 (FIG. 2) of the chain 170. This may occur with the sprocket 100 is not aligned on the shaft along the rotational axis. The wear pattern in FIGS. 7 and 8 could further indicate that the sprocket shaft is not horizontal in the sprocket shaft housing.

FIG. 8 depicts the sprocket gauge 120 having a first gauge side 171 distally disposed from a second gauge side 175. The width between the first gauge side 171 and the second gauge side 175 may be the original width W. In other exemplary embodiments, the width between the first gauge side 171 and the second gauge side 175 may be determined based on a theoretical profile derived from accuracy standards for the sprocket tooth 110 to be measured. Such accuracy standards may include tolerances and other manufacturing specifications.

In other exemplary embodiments, the sprocket gauge 120 may be adapted to different sprocket 100 configurations, such as having multiple concave areas 162 configured to rest on multiple sprocket teeth 110.

Figure 9:
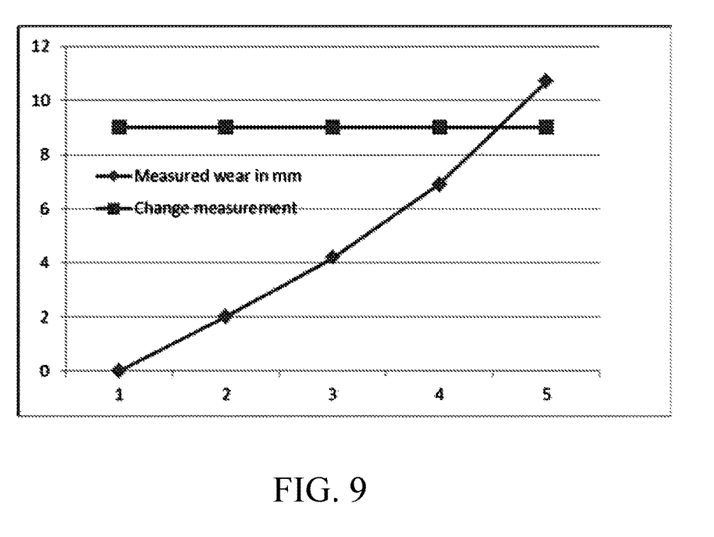
FIG. 9 is a predictive graph illustrating wear approaching the minimum thickness.

An exemplary method for determining tooth wear with an exemplary sprocket gauge may further comprise projecting tooth wear based on a wear rate, calculated by measuring tooth wear at periodic intervals. Such projections may help a mill operator predict when the sprockets should be replaced, which thereby allows the mill operator to budget accordingly. FIG. 9 depicts

TABLE 1

| Date | Measured wear in mm | Change measurement |
| --- | --- | --- |
| 0 | 0 | 9 |
| 0.5 year | 2 | 9 |
| 1 year | 4.2 | 9 |
| 1.5 years | 6.9 | 9 |
| 2 years | 10.7 | 9 |

Table 1 measures wear in millimeters at time intervals. The change measurement represents a measurement just above the minimum thickness of a sprocket tooth. Table 1 further illustrates that the rate of sprocket wear may not be linear. By plotting the wear rate in a graph (see FIG. 9), this exemplary method may further allow mill operators to visualize and predict sprocket tooth wear such that the mill operator may be more encouraged to replace sprockets approaching the change measurement to avoid equipment failure.

While this invention has been particularly shown and described with references to example embodiments thereof, it will be understood by those skilled in the art that various changes in form and details may be made therein without departing from the scope of the invention encompassed by the appended claims.

What is claimed is:

1. A method for determining sprocket tooth wear comprising:
    ascertaining an original distance between a first tooth face and a second tooth face of a sprocket tooth;
    ascertaining an original width between a first base side and a second base side of the sprocket tooth,
        wherein the sprocket tooth comprises:
            the first tooth face extending from a sprocket core and terminating in a top of the sprocket tooth,
            the second tooth face extending from the sprocket core and terminating in the top of the sprocket tooth, wherein the first tooth face is distally disposed from the second tooth face, wherein the original distance separates the first tooth face from the second tooth face, and wherein the original width separates a first gauge side from a second gauge side distally disposed from the first gauge side;
    placing a sprocket gauge on the sprocket tooth,
        wherein the sprocket gauge comprises:
            a bottom,
            a first gauge face extending from the bottom of the sprocket gauge, and
            a second gauge face extending from the bottom of the sprocket gauge distally disposed from the first gauge face, and wherein the original distance between the first tooth face and the second tooth face separates the first gauge face from the second gauge face,
        wherein the bottom of the sprocket gauge is disposed upon the top of the sprocket tooth and the first gauge face is disposed adjacently on the first tooth; and
    comparing the original distance defined by the sprocket gauge with an actual distance between the first tooth face and the second tooth face.

2. The method of claim 1, wherein the second gauge face of e sprocket gauge extends to the sprocket core.

3. The method of claim 1, wherein the second gauge face of the sprocket gauge does not extend to the sprocket core.

4. The method of claim 1, wherein a magnet is disposed within the sprocket gauge, wherein the magnet magnetically engages the sprocket gauge to the sprocket tooth.

5. The method of claim 1, wherein the sprocket gauge defines a gap between the second gauge face and the second tooth face, thereby providing a visual indication of sprocket tooth wear.

6. The method of claim 5 further comprising using a caliper, a ruler, a bar of known size, or other measurement instrument to measure a length of a gap.

7. The method of claim 5, wherein a first side edge of the sprocket gauge and a first side edge of the sprocket tooth define a first gap length and a second side edge of the sprocket gauge and a second side edge of the sprocket tooth define a second gap length.

8. The method of claim 1 further comprising replacing the sprocket when the length of the top of the sprocket tooth approaches the second reference point on the sprocket gauge.

9. A system comprising:
  a sprocket, tooth, wherein the sprocket tooth comprises a first tooth face and a second tooth face extending from a sprocket core and terminating in a top of the sprocket tooth, and wherein the top of the sprocket tooth has an original dimension comprising an original length of the top of the sprocket tooth; and
  a sprocket gauge configured to be placed on the sprocket tooth, wherein the sprocket gauge comprises a bottom, a first gauge face, and a second gauge face distally disposed from the first gauge space, the second gauge face and the first gauge face extending from the bottom of the sprocket gauge, the bottom, first gauge face, and second gauge face defining a concave area, wherein the bottom of the sprocket gauge is disposed upon the top of the sprocket tooth and the first gauge face of the sprocket gauge is disposed adjacent to the first tooth face of the sprocket tooth such that the bottom of the sprocket gauge and the first gauge face of the sprocket gauge form a reflex angle and the top of the sprocket tooth and first tooth face of the sprocket tooth form a center angle, wherein a central point created by the reflex angle and the center angle defines a first reference point, and wherein a length of the top of the sprocket tooth, the length of the top of the sprocket being defined by a distance between the first reference point and an opposite edge of the top of the sprocket tooth, is configured to be compared with a length of the bottom of the sprocket gauge, the length of the bottom of the sprocket gauge being defined by a distance between the first reference point and a second reference point disposed on the bottom of the sprocket gauge distally from the first reference point at a location corresponding to the original length of the top of the sprocket tooth.

10. The system of claim 9, wherein the concave area defines an inverse profile of the sprocket tooth to be measured.

11. The system of claim 9, wherein the original length of the top of the location on the sprocket gauge corresponding to the original length of the top of the sprocket, tooth is determined based on a theoretical tooth profile derived from ISO sprocket tooth profiles for the sprocket tooth.

12. The system of claim 9, wherein the sprocket gauge further comprises a first gauge side distally disposed from a second gauge side and wherein a width between the first gauge side and the second gauge side is determined based on a theoretical tooth profile determined from ISO accuracy standards.

13. The system of claim 12, wherein the location on the sprocket, gauge corresponding to the original length of the top of the sprocket tooth is determined from ISO accuracy standards.

14. The system of claim 9, wherein the original length of the top of the location on the sprocket gauge corresponding to the original length of the top of the sprocket tooth is determined based on a theoretical tooth profile derived from a "K" chart for the sprocket tooth.

15. The system of claim 9, wherein the sprocket gauge further comprises a first gauge side distally disposed from a second gauge side and wherein a width between the first gauge side and the second gauge side is determined based on a theoretical tooth profile determined from a "K" chart.

16. The system of claim 15, wherein the location on the sprocket gauge corresponding to the original length of the top of the sprocket tooth is determined from a "K" chart.

17. The system of claim 9, wherein a magnet is disposed within the sprocket gauge.

18. A method comprising:
  ascertaining original dimensions of a sprocket tooth,
    wherein the original dimensions of the sprocket tooth comprise ascertaining an original width between a first base side and a second base side of the sprocket tooth wherein the sprocket tooth comprises a first tooth face and a second tooth face extending from a sprocket core and terminating in a top of the sprocket tooth, and wherein the original dimensions of the sprocket tooth comprise an original top length of the sprocket tooth, wherein the original top length of the sprocket tooth is a distance between an original first edge of the sprocket tooth and an original second edge of the sprocket tooth;
  placing a sprocket gauge on the sprocket tooth,
    wherein the sprocket gauge comprises a bottom and a first gauge face side extending from the bottom of the sprocket gauge, wherein the bottom of the sprocket gauge is disposed upon the top of the sprocket tooth and the first gauge face side of the sprocket gauge is disposed adjacently on the first tooth face of the sprocket tooth such that the bottom of the sprocket gauge and the first gauge face side of the sprocket gauge form a reflex angle and the top of the sprocket tooth and first tooth face of the sprocket tooth form a central angle, and wherein a central point created by the reflex angle and the center angle defines a first reference point;
  comparing a length of the top of the sprocket tooth, with a length of the bottom of the sprocket gauge, the length of the bottom of the sprocket gauge defined by a distance between the first reference point and an second reference point disposed on the bottom of the sprocket gauge distally from the first reference point at a location corresponding to the original length of the top of the sprocket tooth; and
  replacing the sprocket when the length of the top of the sprocket tooth approaches the second reference point on the bottom of the sprocket gauge.

19. The method of claim 18, wherein the sprocket gauge further comprises a first gauge side distally disposed from a second gauge side and wherein a width between the first gauge side and the second gauge side is determined based on a theoretical tooth profile determined from ISO accuracy standards and wherein the location on the sprocket gauge corresponding to the original length of the top of the sprocket tooth is determined from ISO accuracy standards.

20. The method of claim 18, wherein the sprocket gauge further comprises a first gauge side distally disposed from a second gauge side and wherein a width between the first gauge side and the second gauge side is determined based on a theoretical tooth profile determined from a "K" chart for the sprocket tooth and wherein the location on the sprocket gauge corresponding to the original length of the top of the sprocket tooth is determined from a "K" chart for the sprocket tooth.

* * * * *